United States Patent
Kojima et al.

(10) Patent No.: US 8,296,023 B2
(45) Date of Patent: Oct. 23, 2012

(54) CONTROL APPARATUS AND CONTROL METHOD FOR CONTINUOUSLY VARIABLE TRANSMISSION

(75) Inventors: Sei Kojima, Okazaki (JP); Satoshi Kamijo, Nishikamo-gun (JP); Shinya Toyoda, Nisshin (JP); Susumu Moritomo, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 271 days.

(21) Appl. No.: 12/680,034

(22) PCT Filed: Aug. 27, 2008

(86) PCT No.: PCT/JP2008/065799
§ 371 (c)(1),
(2), (4) Date: Mar. 25, 2010

(87) PCT Pub. No.: WO2009/041226
PCT Pub. Date: Apr. 2, 2009

(65) Prior Publication Data
US 2010/0210412 A1    Aug. 19, 2010

(30) Foreign Application Priority Data
Sep. 28, 2007 (JP) ................... 2007-254894

(51) Int. Cl.
G06F 7/00 (2006.01)
G06F 17/00 (2006.01)
G06F 19/00 (2006.01)

(52) U.S. Cl. ........................................ 701/59

(58) Field of Classification Search ............ 701/59; 477/169
See application file for complete search history.

(56) References Cited

U.S. PATENT DOCUMENTS
5,588,937 A * 12/1996 Kono et al. ............. 477/169
2003/0203790 A1   10/2003 Matsubara et al.

FOREIGN PATENT DOCUMENTS

| JP | A-63-043837 | 2/1988 |
| JP | A-64-058858 | 3/1989 |
| JP | A-05-071638 | 3/1993 |
| JP | A-06-221424 | 8/1994 |
| JP | A-10-122356 | 5/1998 |
| JP | A-2003-322249 | 11/2003 |
| JP | A-2004-124969 | 4/2004 |

OTHER PUBLICATIONS

International Search Report issued in International Application No. PCT/JP2008/065799; Mailed on Oct. 7, 2008 (With Translation).

* cited by examiner

Primary Examiner — Gerald J. O'Connor
Assistant Examiner — John Pauls
(74) Attorney, Agent, or Firm — Oliff & Berridge, PLC

(57) ABSTRACT

An ECU executes a program including the steps of: learning a differential pressure of a lock-up clutch; determining whether or not learning has been completed when a vehicle is in a coasting state and a brake is applied; lowering the lock-up differential pressure such that the lock-up clutch can be disengaged immediately and prohibiting or suppressing control for increasing transmission gain when learning has been completed; and increasing a lower limit guard value for the lock-up differential pressure and performing control for increasing the transmission gain when learning has not been completed.

6 Claims, 6 Drawing Sheets

CONTROL APPARATUS AND CONTROL METHOD FOR CONTINUOUSLY VARIABLE TRANSMISSION

TECHNICAL FIELD

The present invention relates to control of a continuously variable transmission mounted on a vehicle and including a lock-up clutch, and more particularly to control during brake actuation in a freewheeling state (hereinafter sometimes referred to as a sliding state or a coasting state) while improving fuel efficiency by controlling the lock-up clutch to put an engine in a state driven by a drive wheel to prevent engine stall.

BACKGROUND ART

Conventionally, a gear-type transmission (planetary gear type) and a continuously variable transmission (belt type or toroidal type) have been known as an automatic transmission structured to hydraulically control a transmission mechanism. The belt-type continuously variable transmission includes a driving revolution member, a driven revolution member, and a wound power transmission member wound around the driving revolution member and the driven revolution member, and its transmission ratio is controlled by hydraulic control of a winding radius of the wound power transmission member around the driving revolution member.

The belt-type continuously variable transmission includes an input shaft receiving engine torque, an output shaft provided in parallel to this input shaft, a primary pulley provided on the input shaft side, and a secondary pulley provided on the output shaft side. The primary pulley has a fixed sheave fixed to the input shaft, and a movable sheave capable of moving in an axial direction of the input shaft. The secondary pulley has a fixed sheave fixed to the output shaft, and a movable sheave capable of moving in an axial direction of the output shaft. A belt is wound around the primary pulley and the secondary pulley structured as above. Further, there are provided a first hydraulic chamber (fluid pressure chamber) for controlling operation of the movable sheave of the primary pulley and a second hydraulic chamber for controlling operation of the movable sheave of the secondary pulley. By controlling a hydraulic pressure in the first hydraulic chamber, a groove width of the primary pulley is varied, in other words, a winding radius of the belt on the primary pulley side is varied, so that a transmission ratio is controlled.

More specifically, transmission control in such a belt-type continuously variable transmission is performed, for example, by determining a target value for the transmission ratio, detecting an actual value of the transmission ratio of the continuously variable transmission, and executing feedback control with a transmission actuator in accordance with a difference between the target value and the actual value. With this feedback control, in a coasting state, a response of the transmission ratio is a ramp response where the target transmission ratio increases with time, which results in particularly poor responsiveness and following capability of control, and when a vehicle is decelerated rapidly, a speed change toward a larger transmission ratio of the continuously variable transmission is delayed, and in some cases a speed change to a maximum transmission ratio may be impossible before the vehicle stops. If a throttle is opened for reacceleration during such a speed change, frictional force does not act sufficiently on the belt because the speed change toward a larger transmission ratio is still in progress and hydraulic fluid is still being discharged, causing belt slip and failure in motive power transmission as well as belt wear.

Japanese Patent Laying-Open No. 63-43837 (hereinafter referred to as "Patent Document 1") discloses a transmission control device for a continuously variable transmission which solves such problems. Patent Document 1 discloses increasing transmission gain to effect an immediate speed change toward a larger transmission ratio when a brake is applied in a coasting state.

A torque converter is provided between an engine and an automatic transmission, and a torque converter usually includes a lock-up clutch. The lock-up clutch mechanically couples a driving member (a pump impeller on the engine side) of the torque converter and a driven member (a turbine runner on the transmission mechanism side) directly to each other, and can thus achieve both improvement of fuel efficiency and ride comfort. A lock-up region where such a lock-up clutch is engaged is set based on a vehicle speed and an opening position of the throttle, for example.

Moreover, a technique has been known for controlling a lock-up clutch to execute feedback control (slip control) of clamping force (engagement pressure, clamping differential pressure, differential pressure) of that lock-up clutch to a prescribed state in accordance with a speed difference between a pump speed on the input side (which corresponds to an engine speed) and a turbine speed on the output side, and based on a learned value acquired at this time, controlling a slip state of the torque converter appropriately to prevent occurrence of noise and vibration (NV) and improve starting performance of the vehicle.

In this manner, distribution of motive power transmission in a mechanical manner by the lock-up clutch and motive power transmission by the torque converter is finely controlled in accordance with a running state by sophisticated electronic control, thereby significantly increasing transmission efficiency. That is, this lock-up clutch is controlled based on a driving state of the vehicle such as load, revolution and the like, and for example, a low-load and high-revolution region is set as a lock-up region, a high-load and low-revolution region is set as a converter region, and a low-load and intermediate-revolution region is set as a slip region. In the lock-up region, an input element (pump impeller) and an output element (turbine runner) of the torque converter serving as a fluid-type power transmission are completely clamped to each other to improve fuel efficiency performance. In the converter region, the input element and the output element of the fluid-type power transmission are completely disengaged from each other, and torque is increased by a torque-amplifying function of the torque converter. Further, in a coasting state, the input element and the output element of the fluid-type power transmission are half-clamped to each other in the slip region to achieve both improvement of fuel efficiency performance and absorption of shock and vibration.

If a clamping differential pressure of the lock-up clutch has been set to a maximum value (a state with slight slip and the smallest amount of slip) in this slip region, rapid deceleration in a freewheeling state causes lowering in the clamping differential pressure of the lock-up clutch from the maximum value. Thus, lowering the clamping differential pressure of the lock-up clutch to release lock-up (disengage the lock-up clutch) tends to be delayed, which may result in engine stall. In such a slip state, therefore, a borderline clamping differential pressure which barely avoids slip is set, and when large torque is input from wheels due to rapid deceleration, an amount of slip is ensured to thereby prevent engine stall. This borderline clamping differential pressure is calculated as follows. Specifically, a small clamping differential pressure which does not cause slip (hereinafter referred to as an initial differential pressure) is once provided at the start of coasting lock-up, this initial differential pressure is lowered by using PI control and the like to a clamping differential pressure where a small amount of slip is obtained, and a prescribed offset differential pressure is added to the clamping differential pressure where the small amount of slip was obtained (learned differential pressure). By using this (learned differential pressure+offset differential pressure) as a clamping differential pressure, occurrence of engine stall is prevented even during rapid deceleration while improving fuel efficiency.

In such learning and controlling, learning takes time depending on an individual difference of the lock-up clutch, which may result in engine stall if rapid deceleration occurs during this time. Japanese Patent Laying-Open No. 2004-124969 (hereinafter referred to as "Patent Document 2") discloses a lock-up clutch control device for an automatic transmission which solves such a problem. Patent Document 2 discloses completing learning and controlling of a clamping differential pressure early in slip control of the lock-up clutch in a coasting state.

As described above, when learning and controlling of a lock-up clutch has been completed, the lock-up clutch can be controlled appropriately. That is, even when a brake is actuated in a coasting state, the lock-up clutch can be controlled appropriately to be disengaged, thereby preventing engine stall. Namely, even when a speed of a drive wheel is reduced rapidly due to hard braking, the lock-up clutch can be disengaged immediately, thereby attaining control for preventing reduction in engine speed.

When learning and controlling of a lock-up clutch has not been completed, however, the lock-up clutch may not be controlled appropriately (the lock-up clutch may not be disengaged immediately during hard braking), and hence it is controlled as follows. When a brake is actuated in a coasting state, as described above, the lock-up clutch is controlled by increasing transmission gain to effect an immediate speed change toward a larger transmission ratio to maintain the engine speed high, thereby preventing engine stall.

It is conceivable, however, that such control may result in the following situation. In order to increase the transmission gain to effect an immediate speed change toward a larger transmission ratio, a hydraulic pressure (line pressure) also used for actuating the lock-up clutch is used in large amounts for transmission control. Here, in addition to the fact that learning and controlling of the lock-up clutch is incomplete, there is a shortage of hydraulic fluid pressure (particularly when the differential pressure is set low such that the lock-up clutch can be disengaged immediately during brake actuation in a coasting state), causing the lock-up clutch to move to a disengagement side (a side with a large amount of slip, where the clutch tends to slip). Because of this, even if the transmission ratio is increased, it becomes difficult to transmit torque from the drive wheel to the engine (in a fuel injection halting state). The engine speed will thus not increase, which may cause engine stall. As such, when learning is incomplete, the differential pressure of the lock-up clutch in a coasting state cannot be set low (cannot be set to allow immediate disengagement). As a result, the lock-up clutch cannot be disengaged immediately when a brake is applied in a coasting state, resulting in reduction in engine speed and possibly engine stall.

Even if an immediate speed change toward a larger transmission ratio can be effected and the engine can be maintained in a sufficient driven state, deceleration acting on the vehicle changes rapidly, which gives uncomfortable feeling to travelers on the vehicle.

DISCLOSURE OF THE INVENTION

The present invention was made in order to solve the above-described problems, and an object thereof is to provide a control apparatus and a control method for a continuously variable transmission which prevent engine stall and further prevent a rapid change in deceleration acting on a vehicle as much as possible even when a brake is applied in a coasting state.

A control apparatus according to an aspect of the present invention is a control apparatus for a continuously variable transmission including a lock-up clutch. This control apparatus includes learning means for learning a hydraulic fluid pressure of the lock-up clutch, and transmission control means for executing transmission feedback control by increasing transmission gain when brake manipulation is detected as compared to when brake manipulation is not detected. The transmission control means includes means for suppressing an amount of increase in the transmission gain after completion of learning of the hydraulic fluid pressure as compared to before completion.

According to this configuration, the hydraulic fluid pressure of the lock-up clutch is learned in order to eliminate an individual difference of the lock-up clutch and a difference of the lock-up clutch involved with temporal change. After learning is completed, even when a brake is actuated in a coasting state, for example, the lock-up clutch can be controlled appropriately to be disengaged immediately, thereby preventing engine stall. Here, an amount of increase in transmission gain is suppressed to prevent a rapid speed change, thereby preventing a rapid change in deceleration acting on the vehicle. Before learning is completed, on the other hand, the transmission gain is increased to effect an immediate speed change toward a larger transmission ratio to maintain the engine speed high, thereby preventing engine stall. That is, since the possibility of engine stall can be lowered after completion of learning (because the lock-up clutch can be controlled appropriately), an amount of increase in transmission gain to prevent engine stall is suppressed, thereby reducing shock due to deceleration acting on the vehicle while preventing engine stall. As a result, a control apparatus for a continuously variable transmission can be provided that prevents engine stall and further prevents a rapid change in deceleration acting on the vehicle as much as possible even during brake application (braking) in a coasting state and the like.

Preferably, the transmission control means includes means for executing the transmission feedback control by increasing the transmission gain when the brake manipulation is detected in a coasting state as compared to when it is not detected.

According to this configuration, after learning is completed, when a brake is actuated in a coasting state, the lock-up clutch can be controlled appropriately to prevent engine stall. Before learning is completed, the transmission gain is increased to effect an immediate speed change toward a larger transmission ratio to maintain the engine speed high, thereby preventing engine stall.

Preferably, the control apparatus further includes means for limiting the hydraulic fluid pressure of the lock-up clutch such that the lock-up clutch is not disengaged before completion of the learning.

According to this configuration, before learning is completed, the transmission gain is increased to effect an immediate speed change toward a larger transmission ratio, to effect a rapid speed change toward a larger transmission ratio. Thus, a hydraulic pressure (line pressure) also used for actuating the lock-up clutch is used in large amounts for transmission control. Nonetheless, since the hydraulic fluid pressure is limited such that the lock-up clutch is not disengaged, there is not a shortage of hydraulic fluid pressure, thus preventing the lock-up clutch from moving to a disengagement side (a side where the clutch tends to slip). Therefore, the transmission ratio is increased, and torque from a drive wheel is transmitted to the engine (in a fuel injection halting state) via the lock-up clutch to increase (raise) the engine speed, thereby preventing engine stall.

Preferably, the transmission control means includes means for preventing increase in the transmission gain after completion of the learning as compared to before completion.

According to this configuration, after learning is completed, the transmission gain is not increased (increase in transmission gain is prohibited), so that a rapid speed change toward a larger transmission ratio can be prevented, thereby preventing a rapid change in deceleration acting on the vehicle while preventing engine stall.

BEST MODES FOR CARRYING OUT THE INVENTION

Figure 1:
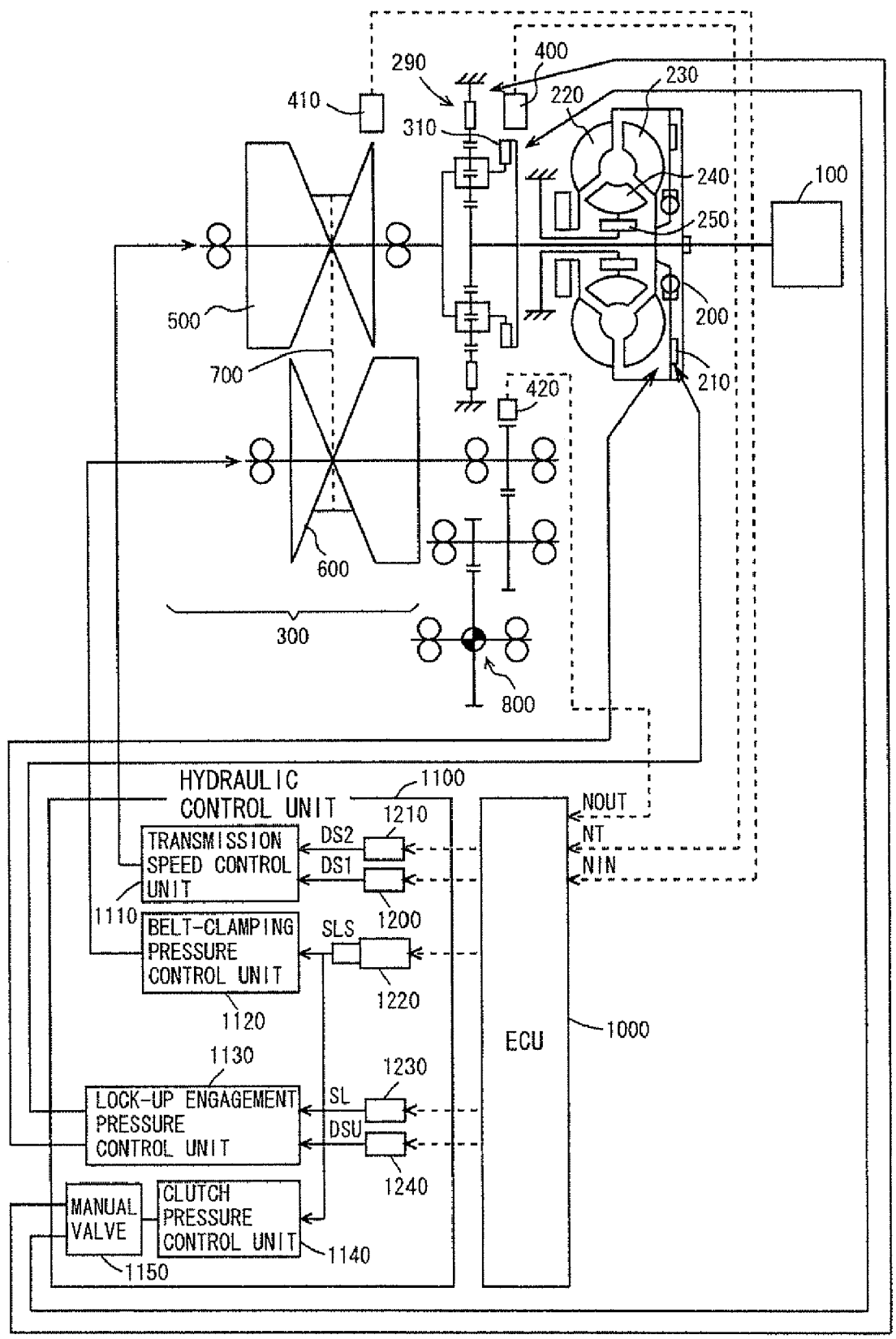
FIG. 1 is a control block diagram of an automatic transmission according to an embodiment of the present invention.

In the following, embodiments of the present invention will be described with reference to the figures. In the following description, the same components have the same reference characters, and names and functions thereof are also the same. Therefore, detailed description thereof will not be repeated.

Referring to FIG. 1, a powertrain in a vehicle including a control apparatus according to the present embodiment will be described. The control apparatus according to the present embodiment is implemented by an ECU (Electronic Control Unit) 1000 shown in FIG. 1 (more specifically, an ECT (Electronic Controlled Automatic Transmission)_ECU 1020 which will be described later). In the following, an automatic transmission will be described as a belt-type continuously variable transmission, however, the automatic transmission to which the control apparatus according to the embodiment of the present invention is applicable is not limited to a belt-type continuously variable transmission. Any continuously variable transmission other than the belt type capable of varying a transmission ratio in a continuously variable manner is applicable.

As shown in FIG. 1, this powertrain in the vehicle includes an engine 100, a torque converter 200, a forward-reverse switching device 290, a belt-type continuously variable transmission (CVT) 300, a differential gear 800, ECU 1000, and a hydraulic control unit 1100.

An output shaft of engine 100 is connected to an input shaft of torque converter 200. Engine 100 and torque converter 200 are coupled to each other by a rotation shaft. Accordingly, an output shaft speed NE of engine 100 (engine speed NE) sensed by an engine speed sensor and an input shaft speed of torque converter 200 (pump speed) are equal to each other.

Torque converter 200 includes a lock-up clutch 210 for coupling the input shaft and an output shaft directly to each other, a pump impeller 220 on the input shaft side, a turbine impeller 230 on the output shaft side, and a stator 240 for generating a torque amplifying function by being supported by a case via a one-way clutch 250. Torque converter 200 and CVT 300 are connected to each other by a rotation shaft. An output shaft speed NT of torque converter 200 (turbine speed NT) is sensed by a turbine speed sensor 400.

CVT 300 is connected to torque converter 200 via forward-reverse switching device 290. CVT 300 includes a primary pulley 500 on the input side, a secondary pulley 600 on the output side, and a belt 700 made of metal wound around primary pulley 500 and secondary pulley 600. Primary pulley 500 includes a fixed sheave fixed to a primary shaft and a movable sheave supported by the primary shaft in a manner only slidable. Secondary pulley 600 includes a fixed sheave fixed to a secondary shaft and a movable sheave supported by the secondary shaft in a manner only slidable. A speed NIN of the primary pulley of CVT 300 is detected by a primary pulley speed sensor 410, and a speed NOUT of the secondary pulley of CVT 300 is detected by a secondary pulley speed sensor 420.

These speed sensors are provided facing teeth of speed detection gears attached to rotation shafts of the primary pulley and the secondary pulley and to a drive shaft connected thereto. These speed sensors can detect even a slight revolution of the primary pulley serving as an input shaft and the secondary pulley serving as an output shaft of CVT 300, and include a magnetoresistance element commonly referred to as a semiconductor sensor, for example.

Forward-reverse switching device 290 has a double-pinion planetary gear, a reverse (for reverse travel) brake B1, and an input clutch C1. The planetary gear has its sun gear coupled to an input shaft, a carrier CR supporting first and second pinions P1, P2 coupled to the fixed sheave on the primary side, a ring gear R coupled to reverse brake B1 serving as a frictional engagement element for reverse travel, and input clutch C1 interposed between carrier CR and ring gear R. This input clutch 310 is also called a clutch for forward travel or a forward clutch, and is used in an engagement state whenever the vehicle in a position other than a parking (P) position, an R position, and an N position travels forward.

Referring to FIG. 1, ECU 1000 and hydraulic control unit 1100 for controlling the powertrain will be described.

As shown in FIG. 1, ECU 1000 (more specifically, ECT_ECU 1020 which will be described later) receives a signal indicating turbine speed NT from turbine speed sensor 400, a signal indicating primary pulley speed NIN from primary pulley speed sensor 410, and a signal indicating secondary pulley speed NOUT from secondary pulley speed sensor 420.

As shown in FIG. 1, hydraulic control unit 1100 includes a transmission speed control unit 1110, a belt-clamping pressure control unit 1120, a lock-up engagement pressure control unit 1130, a clutch pressure control unit 1140, and a manual valve 1150. ECU 1000 outputs control signals to a duty solenoid (1) 1200 for transmission control, a duty solenoid (2) 1210 for transmission control, a linear solenoid 1220 for belt-clamping pressure control, a lock-up solenoid 1230, and a duty solenoid 1240 for lock-up engagement pressure control in hydraulic control unit 1100. Details of this hydraulic circuit are disclosed in Japanese Patent Laying-Open No. 2002-181175, for example, and thus detailed description thereof will not be repeated here.

Figure 2:
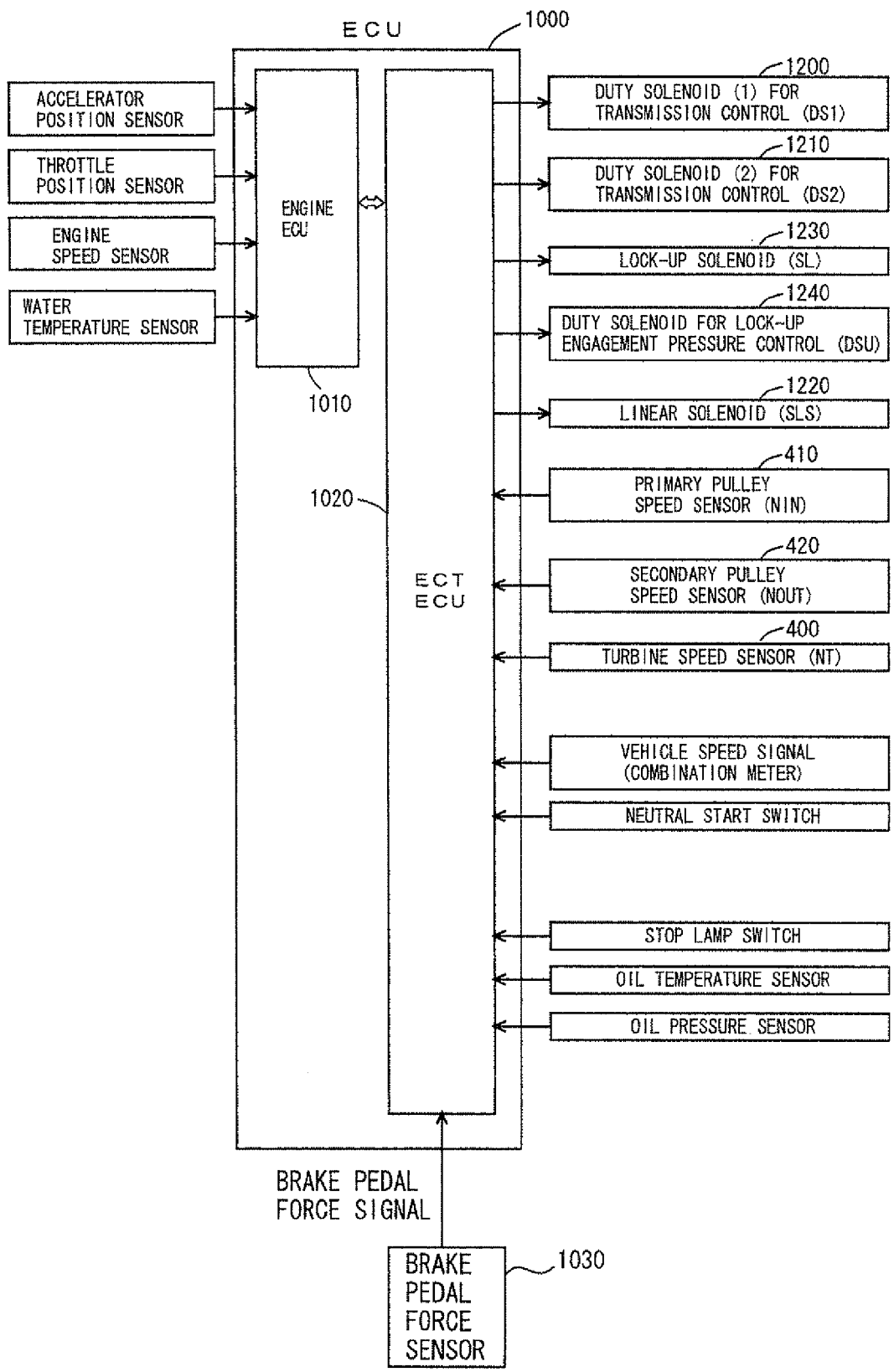
FIG. 2 is a detailed view of an ECU shown in FIG. 1.

Referring to FIG. 2, a structure of ECU 1000 for controlling the powertrain will be described in further detail. As shown in FIG. 2, ECU 1000 includes an engine ECU 1010 for controlling engine 100, and ECT_ECU 1020 for controlling CVT 300.

In addition to the input and output signals shown in FIG. 1, ECU 1000 (engine ECU 1010) receives a signal indicating a position of an accelerator being pressed by a driver from an accelerator position sensor, a signal indicating an opening position of an electronically controlled throttle from a throttle position sensor, and a signal indicating the speed (NE) of engine 100 from the engine speed sensor. Engine ECU 1010 and ECT_ECU 1020 are connected to each other.

Further, ECT_ECU 1020 receives a brake pedal force signal indicating force on a brake pedal by the driver from a brake pedal force sensor 1030. It is noted that an amount of stroke of the brake pedal or a brake hydraulic pressure may be used rather than the brake depression.

In hydraulic control unit 1100, in response to a control signal output from ECT_ECU 1020 to linear solenoid 1220 for belt-clamping pressure control, belt-clamping pressure control unit 1120 controls a clamping pressure of belt 700 in CVT 300. The clamping pressure of belt 700 refers to a pressure under which the pulleys and the belt are in contact with one another, and may also be called belt tension. The higher this pressure, the less likely occurrence of slip of belt 700 on the pulleys, and the less likely occurrence of slip of belt 700 at start-up of the vehicle on an ascending slope.

Further, this ECT_ECU 1020 performs learning and controlling of an engagement hydraulic pressure of lock-up clutch 210, as described in Patent Document 2.

Figure 3:
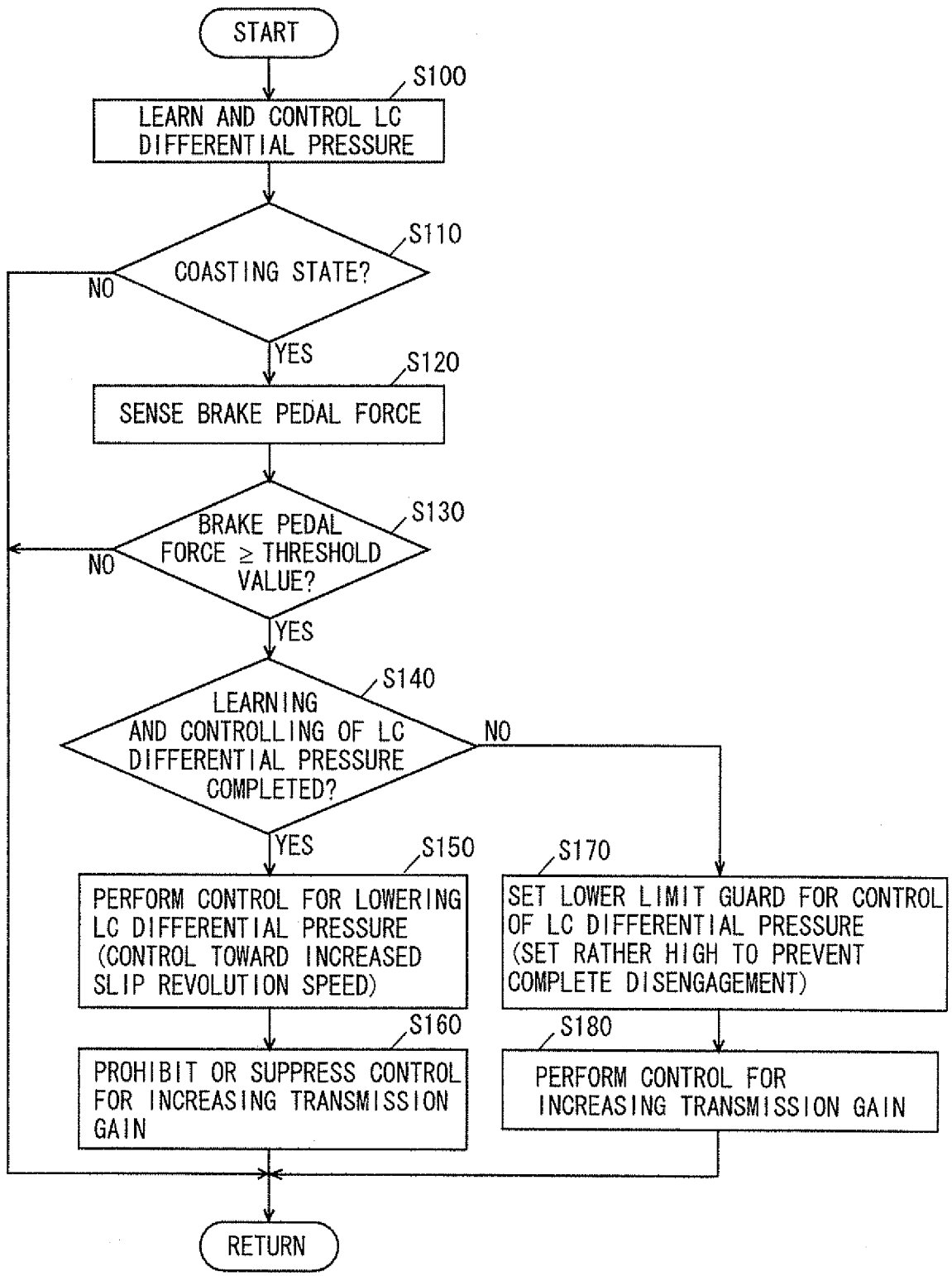
FIG. 3 is a flowchart illustrating a control structure of a program executed in the ECU according to the embodiment of the present invention.

Referring to FIG. 3, a control structure of a program executed in ECT_ECU 1020 serving as the control device according to the present embodiment will be described. It is noted that the program represented in the flowchart illustrated in FIG. 3 is a subroutine program, and executed repeatedly in predetermined time cycles.

At step (hereinafter, step is abbreviated as "S") 100, ECT_ECU 1020 performs learning and controlling of an engagement hydraulic pressure (hereinafter also referred to as a differential pressure) of lock-up clutch 210. In the figures, learning and controlling of the engagement hydraulic pressure of lock-up clutch 210 is denoted as "learn and control LC differential pressure." As described above, this learning and controlling is performed, for example, in order to eliminate an individual difference caused during manufacture of lock-up clutch 210 and an individual difference involved with temporal change to thereby implement an appropriate slip state in a slip region. This learning and controlling is performed when a learned value has been cleared, or after a predetermined time period has elapsed since completion of the previous learning, or the like. In particular, it is required to learn an engagement hydraulic pressure for implementing a state where lock-up clutch 210 can be disengaged immediately during braking in a coasting state, as described in Patent Document 2.

At S110, ECT_ECU 1020 determines whether or not the vehicle is in a coasting state. The vehicle is determined to be in a coasting state if an opening position of the throttle is in a completely closed state and the engine speed is within a predetermined range, for example. If the vehicle is determined to be in a coasting state (YES at S110), the process proceeds to S120. If not (NO at S110), this process ends.

At S120, ECT_ECU 1020 senses brake depression based on a brake pedal force signal input from brake pedal force sensor 1030. At S130, ECT_ECU 1020 determines whether or not the sensed brake pedal force is greater than or equal to a threshold value. Here, for example, a value where deceleration actually acts on the vehicle is set as the threshold value. If the sensed brake pedal force is greater than or equal to the threshold value (YES at S130), the process proceeds to S140. If not (NO at S130), this process ends.

At S140, ECT_ECU 1020 determines whether or not learning and controlling of the differential pressure of lock-up clutch 210 has been completed. Learning and controlling of the differential pressure of lock-up clutch 210 is determined to have been completed, for example, if the slip revolution speed N (SLP), which is a speed difference between the input shaft speed and the output shaft speed of lock-up clutch 210, is implemented with a control hydraulic pressure (control duty) set for a target slip revolution speed. It is noted that how to determine whether or not learning and controlling of the differential pressure of lock-up clutch 210 has been completed is not limited as such. For example, determination may be made as to whether or not learning of an engagement hydraulic pressure capable of implementing a state where lock-up clutch 210 can be disengaged immediately during braking in a coasting state has been completed. If learning and controlling of the differential pressure of lock-up clutch 210 has been completed (YES at S140), the process proceeds to S150. If not (NO at S140), the process proceeds to S170.

At S150, ECT_ECU 1020 performs control to lower the differential pressure of lock-up clutch 210 such that lock-up clutch 210 can be controlled to be disengaged immediately. At S160, ECT_ECU 1020 prohibits control for increasing transmission gain or limits a range of increase in gain, to suppress the control for increasing the transmission gain. Thereafter, the process ends.

At S170, ECT_ECU 1020 sets a lower limit value for control of the differential pressure of lock-up clutch 210 rather high such that lock-up clutch 210 is not completely disengaged, to guard the lower limit value. Thus, a possibility that lock-up clutch 210 is completely disengaged can be prevented. At S180, ECT_ECU 1020 performs control for increasing the transmission gain. Thereafter, the process ends.

It is noted that the processing at S150 and S170 is not limited to that performed when a brake is applied in a coasting state.

With regard to S150, control for lowering the differential pressure of lock-up clutch 210 may be performed if learning and controlling of the differential pressure of lock-up clutch 210 has been completed and the vehicle is in a coasting state. That is, in preparation for brake application in a coasting state, the differential pressure of lock-up clutch 210 may be lowered such that lock-up clutch 210 can be disengaged immediately.

With regard to S170, the lower limit guard for control of the differential pressure of lock-up clutch 210 may be set rather high if learning and controlling of the differential pressure of lock-up clutch 210 is incomplete and the vehicle is in a coasting state. That is, in preparation for brake application in a coasting state, the lower limit guard for the differential pressure of lock-up clutch 210 may be set rather high such that lock-up clutch 210 is not disengaged even when processing for increasing the transmission gain is performed during the brake application.

An operation of the vehicle will be described, on which the powertrain controlled by the control apparatus according to the present embodiment is mounted, based on the structure and the flowchart as described above.

<After Completion of Learning and Controlling of Lock-Up Differential Pressure>

Figure 4:
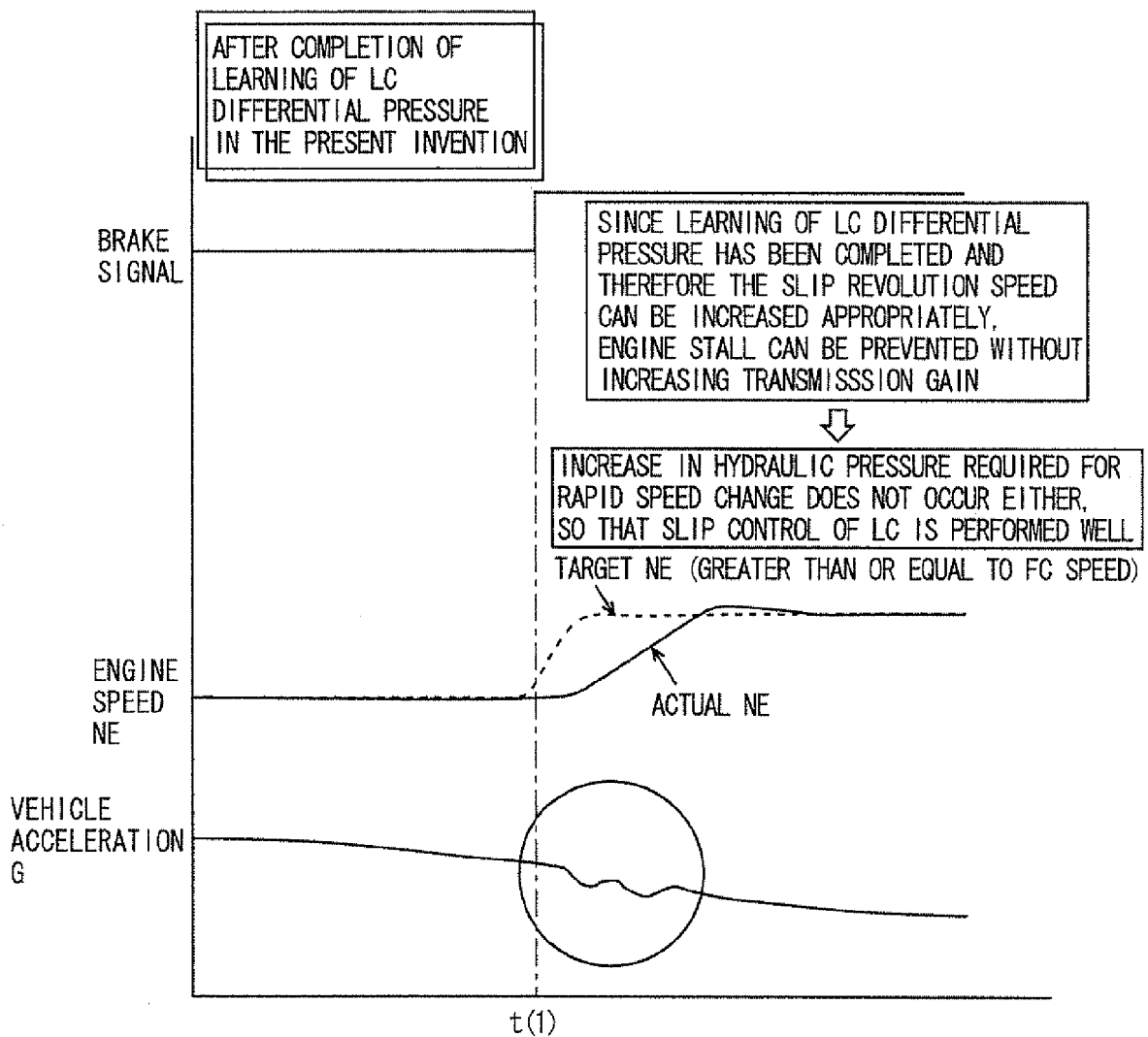
FIG. 4 is a timing chart (No. 1) when the control shown in FIG. 3 is performed in the ECU.

Referring to FIG. 4, an operation of the vehicle when learning and controlling of the lock-up differential pressure has been completed will be described.

Learning and controlling of the differential pressure of the lock-up clutch is performed (S100), and learning and controlling has been completed. In this state, the timing of brake pedal operation (YES at S130) while a running state of the vehicle is a coasting state (YES at S110) is indicated by a time t(1) in FIG. 4.

Here, since learning and controlling of the lock-up differential pressure has been completed, control is performed such that lock-up clutch 210 can be controlled appropriately and disengaged immediately (S150). Accordingly, without increasing the transmission gain, lock-up clutch 210 can be disengaged immediately in response to brake actuation, thereby preventing engine stall. Moreover, since control for increasing the transmission gain is prohibited or a range of increase in gain is suppressed (S160), increase in hydraulic pressure required for a rapid speed change does not occur either, so that lock-up clutch 210 is controlled well.

As shown in FIG. 4, therefore, an actual engine speed follows a target speed well without being excessive with respect to the target speed, and/or without fluctuation. Thus, acceleration (deceleration in this case) G acting on the vehicle does not act significantly, as indicated by a circle. As a result, engine stall can be prevented even when a brake is applied in a coasting state, without giving uncomfortable feeling to travelers on this vehicle.

<Before Completion of Learning and Controlling of Lock-up Differential Pressure>

Figure 5:
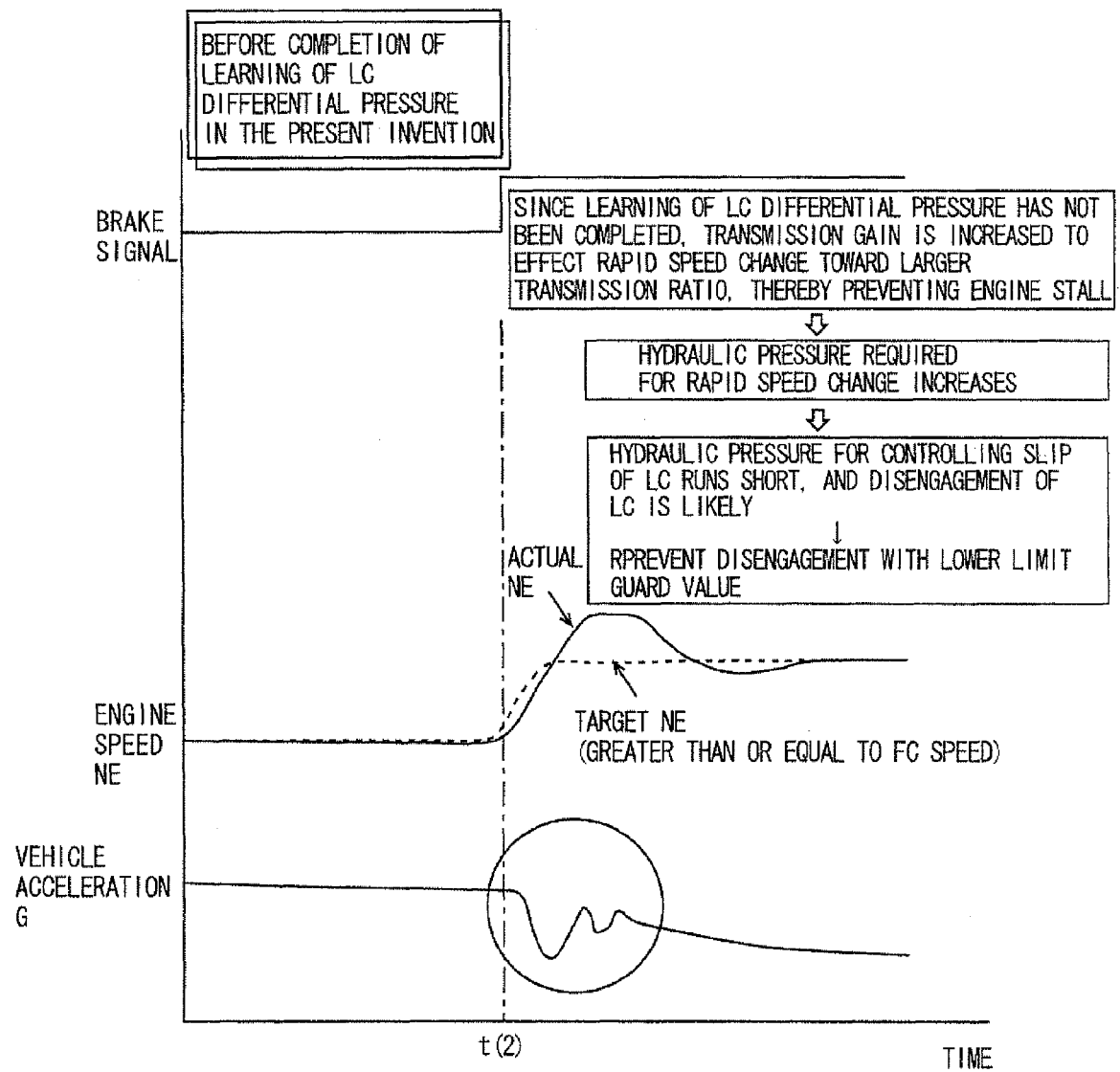
FIG. 5 is a timing chart (No. 2) when the control shown in FIG. 3 is performed in the ECU.

Referring to FIG. 5, an operation of the vehicle when learning and controlling of the lock-up differential pressure has not been completed will be described.

Learning and controlling of the differential pressure of the lock-up clutch is performed (S100), and learning and controlling has not been completed. In this state, the timing of brake pedal operation (YES at S130) while a running state of the vehicle is a coasting state (YES at S110) is indicated by a time t(2) in FIG. 5.

Here, since learning and controlling of the lock-up differential pressure has not been completed, lock-up clutch 210 cannot be disengaged immediately in an appropriate manner, or it is unclear whether or not lock-up clutch 210 can be disengaged. Accordingly, the transmission gain is increased to effect a rapid speed change toward a larger transmission ratio, thereby preventing engine stall (S180). Moreover, control for increasing the transmission gain performed causes increase in the hydraulic pressure required for the rapid speed change. This may result in a shortage of hydraulic pressure for controlling lock-up clutch 210, and may cause disengagement of lock-up clutch 210. In order to prevent such an event, the lower limit guard value is set rather high (S170).

As shown in FIG. 5, therefore, an actual engine speed becomes excessive with respect to the target speed and fluctuates to some degree, so that acceleration (deceleration in this case) G acting on the vehicle acts more significantly than in FIG. 4, as indicated by a circle. Nonetheless, since lock-up clutch 210 is not disengaged and the rapid speed change toward a larger transmission ratio has been effected, torque from the drive wheel can be reliably transmitted to the engine via lock-up clutch 210, thereby maintaining the engine speed to be greater than or equal to the target speed even with reduction in a vehicle speed. As a result, engine stall can be prevented even when a brake is applied in a coasting state.

<Comparison with Conventional Technique>

Figure 6:
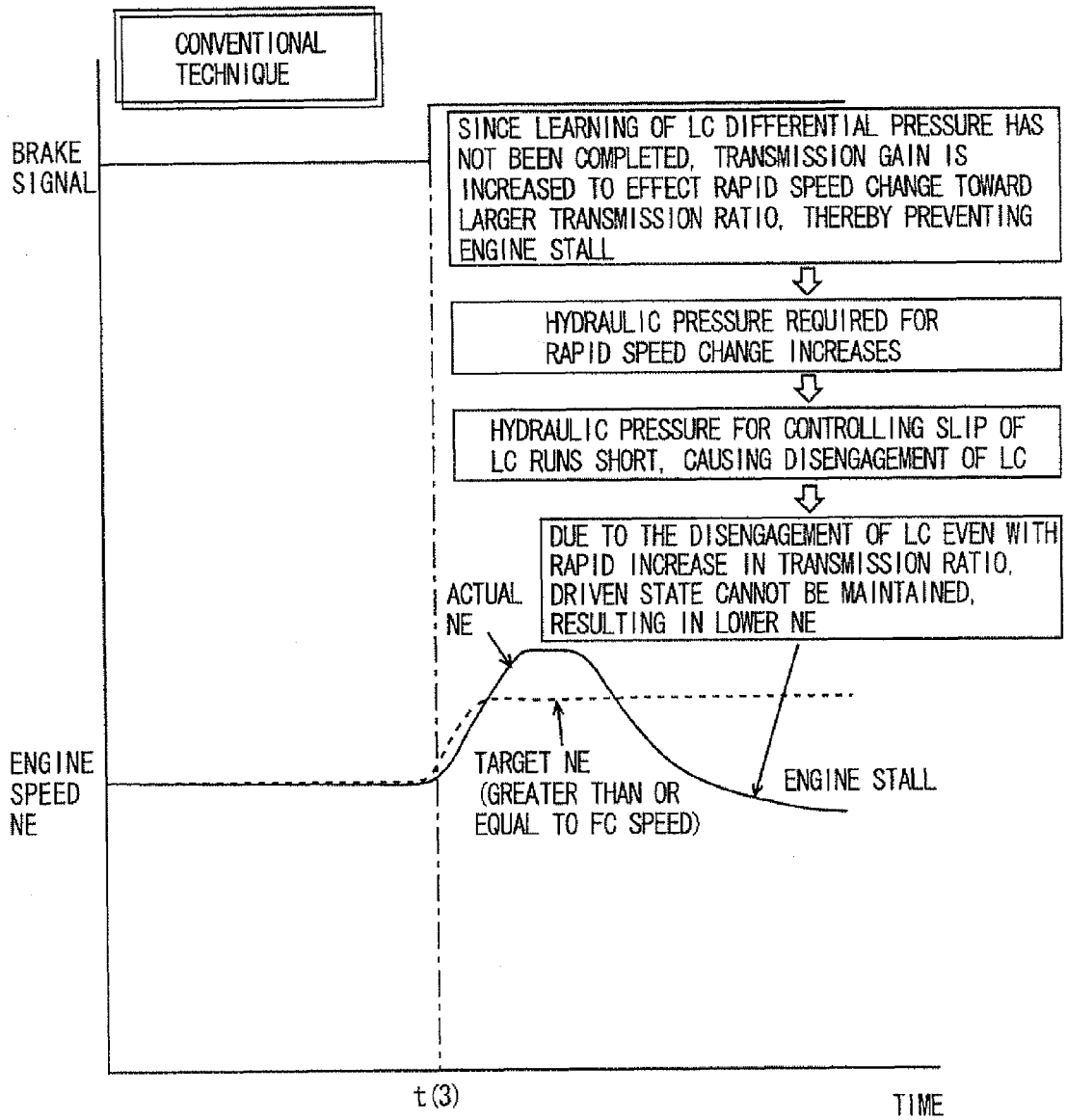
FIG. 6 is a timing chart when control according to a conventional technique is performed.

Referring to FIG. 6, conventional control when learning and controlling of lock-up has not been completed or learning and controlling of lock-up is not performed in the first place will be described, as compared to the present invention illustrated in FIGS. 4 and 5.

Timing of brake pedal operation while a running state of the vehicle is a coasting state is indicated by a time t(3) in FIG. 6, when learning and controlling of a differential pressure of a lock-up clutch is performed but has not been completed, or when learning and controlling of a differential pressure of a lock-up clutch is not performed in the first place.

Here, since learning and controlling of the lock-up differential pressure has not been completed, the lock-up clutch cannot be controlled appropriately, or it is unclear whether or not the lock-up clutch can be controlled appropriately. Thus, the transmission gain is increased to prevent engine stall. Moreover, control for increasing the transmission gain is performed, causing increase in the hydraulic pressure required for the rapid speed change. This may result in a shortage of hydraulic pressure for controlling the lock-up clutch, causing disengagement of the lock-up clutch or increased tendency of disengagement.

Accordingly, even if the transmission ratio can be increased rapidly, the lock-up clutch is disengaged, and thus torque from the drive wheel (even after the speed thereof is increased by a transmission) is not transmitted sufficiently to the engine, or less likely to be transmitted. Consequently, a sufficient driven state cannot be implemented and the engine speed is reduced, resulting in engine stall or recovery from fuel cut-off. Thus, improvement of fuel economy cannot be expected.

As described above, according to the control apparatus for the continuously variable transmission of the present embodiment, when a brake is applied in a coasting state after completion of learning and controlling of the differential pressure of the lock-up clutch, appropriate control of the lock-up differential pressure allows immediate disengagement of the lock-up clutch during brake actuation in a coasting state, thereby preventing engine stall caused by speed reduction of the drive wheel. Further, in this case, travelers on the vehicle will not have uncomfortable feeling because a rapid speed change toward a larger transmission ratio is not effected.

When a brake is applied in a coasting state before completion of learning and controlling of the differential pressure of the lock-up clutch, the transmission gain is increased to effect a rapid speed change toward a larger transmission ratio, and the lower limit guard for the differential hydraulic pressure of the lock-up clutch is set to a high value such that the lock-up clutch is not completely disengaged. As a result, engine stall caused by speed reduction of the drive wheel can be prevented.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

The invention claimed is:

1. A control apparatus for a continuously variable transmission including a lock-up clutch, comprising:

learning means for performing a learning cycle in which a hydraulic fluid pressure of said lock-up clutch is learned;

wherein the hydraulic fluid pressure controls said lock-up clutch to engage, disengage, or slip;

transmission control means for executing transmission feedback control by increasing transmission gain when brake manipulation is detected as compared to when brake manipulation is not detected; and means for limiting said hydraulic fluid pressure of said lock-up clutch such that said lock-up clutch is not disengaged before completion of the learning cycle, said transmission control means including means for (i) suppressing an amount of increase in said transmission gain after completion of the learning cycle as compared to before completion of the learning cycle, or (ii) preventing increase in said transmission gain after completion of the learning cycle as compared to before completion of the learning cycle.

2. The control apparatus according to claim 1, wherein said transmission control means includes means for executing said transmission feedback control by increasing said transmission gain when said brake manipulation is detected in a coasting state as compared to when said brake manipulation is not detected.

3. A control method for a continuously variable transmission including a lock-up clutch, comprising the steps of:

performing a learning cycle in which a hydraulic fluid pressure of said lock-up clutch is learned; wherein the hydraulic fluid pressure controls said lock-up clutch to engage, disengage, or slip; executing transmission feedback control by increasing transmission gain when brake manipulation is detected as compared to when brake manipulation is not detected; and limiting said hydraulic fluid pressure of said lock-up clutch such that said lock-up clutch is not disengaged before completion of the learning cycle, said step of executing transmission feedback control including the step of (i) suppressing an amount of increase in said transmission gain after completion of the learning cycle as compared to before completion of the learning cycle, or (ii) preventing increase in said transmission gain after completion of the learning cycle as compared to before completion of the learning cycle.

4. The control method according to claim 3, wherein said step of executing transmission feedback control includes the step of executing said transmission feedback control by increasing said transmission gain when said brake manipulation is detected in a coasting state as compared to when said brake manipulation is not detected.

5. A control apparatus for a continuously variable transmission including a lock-up clutch, comprising a controller that:

performs a learning cycle in which a hydraulic fluid pressure of said lock-up clutch is learned; wherein the hydraulic fluid pressure controls said lock-up clutch to engage, disengage, or slip;

executes transmission feedback control by increasing transmission gain when brake manipulation is detected as compared to when brake manipulation is not detected;

limits said hydraulic fluid pressure of said lock-up clutch such that said lock-up clutch is not disengaged before completion of the learning cycle; and (i) suppresses an amount of increase in said transmission gain after completion of the learning cycle as compared to before completion of the learning cycle, or (ii) prevents increase in said transmission gain after completion of the learning cycle as compared to before completion of the learning cycle.

6. The control apparatus according to claim 5, wherein the controller executes said transmission feedback control by increasing said transmission gain when said brake manipulation is detected in a coasting state as compared to when said brake manipulation is not detected.

* * * * *